May 18, 1937.    C. F. KETTERING    2,080,487
SYNCHRONOUS CONTROL OF CLUTCH SERVOS
Filed May 28, 1931    2 Sheets-Sheet 1

Inventor
Charles F. Kettering
By Blackmore, Spencer & Hinkle
Attorneys

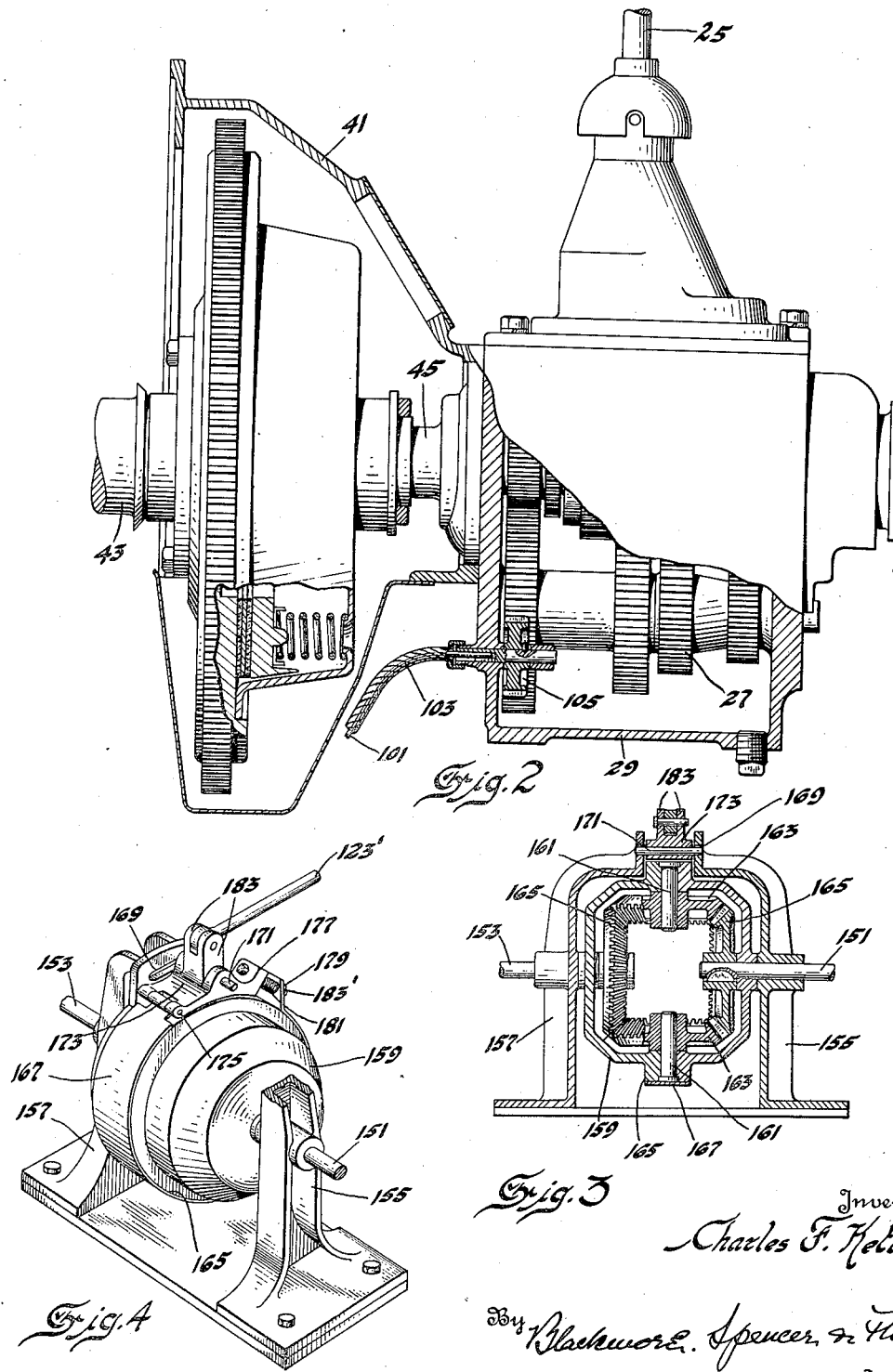

Patented May 18, 1937

2,080,487

UNITED STATES PATENT OFFICE 2,080,487

SYNCHRONOUS CONTROL OF CLUTCH SERVOS

Charles F. Kettering, Dayton, Ohio, assignor, by mesne assignments, to General Motors Corporation, Detroit, Mich., a corporation of Delaware Application May 28, 1931, Serial No. 540,654

7 Claims. (Cl. 192—.01)

This invention relates to motor vehicles. More particularly it relates to control mechanism for motor vehicles wherein power-operated means is used to release the clutch.

The primary object is to improve the operation of such a power-operated clutch releasing device. A further and more specific object is to improve the action of clutch reengagement.

Other objects and advantages will be understood from the following specification.

The invention will be described with reference to the accompanying drawings, which show several illustrative embodiments.

In the drawings—

Fig. 2 is a view partly in side elevation and partly in section of the clutch and transmission units showing a power take-off associated with the latter.

Fig. 3 is a transverse section through a part of the control mechanism employed in a modified form of the invention.

Fig. 4 is a perspective view of the modified control mechanism.

Figure 1:
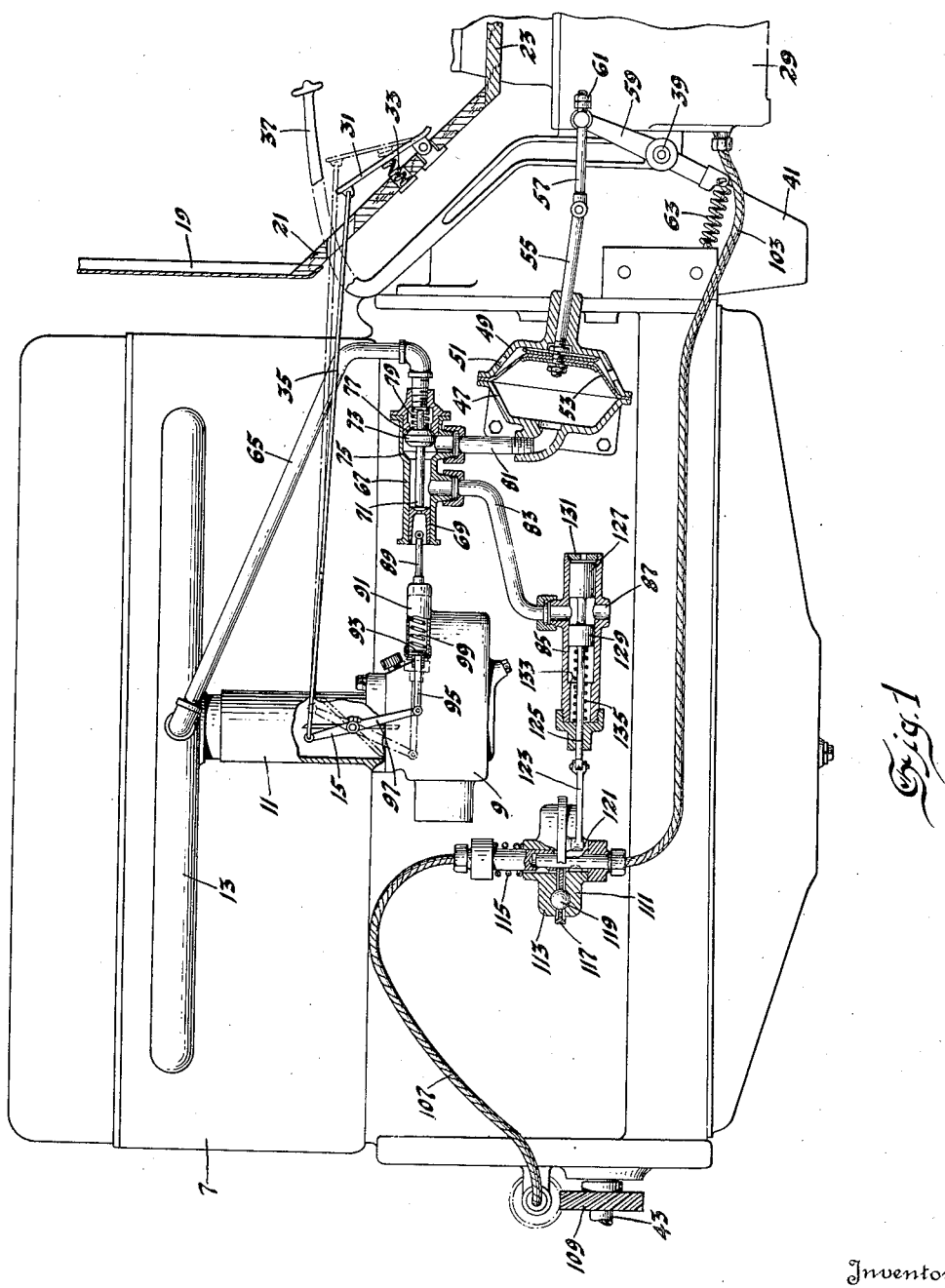
Fig. 1 is a view of an engine of a motor vehicle, the novel details associated therewith being shown partly in section.

The engine clutch of a motor vehicle is usually controlled by a pedal operated by the driver's foot. It is already well known that power derived from some moving part of the vehicle may be used to disengage the clutch. Air pressure, both above or below atmosphere, pressure from circulating liquids and mechanical interlinkage have been used. The controls for power operation of the clutch have sometimes been connected to levers or pedals affecting clutch operation only. The controls have also been connected to pedals or levers which also affect other functions on the vehicle. The control on the servo is conveniently connected to the accelerator pedal in such a way that the clutch is disengaged when the accelerator pedal is in the retracted position. It has been found very difficult to get satisfactory operation under all conditions of operation with such a control arrangement. If the rate of clutch reengagement is satisfactory for moderate speed driving the clutch may engage on reopening the throttle when the car is "free wheeling" at high speed before the engine speed has reached the clutch shaft speed, with the result that the engine momentarily slows down the car.

The present invention provides a simple mechanical means for preventing the clutch reengagement until the engine reaches the clutch shaft speed. It eliminates the need of any additional piping to carry fluids under pressure between various locations on the car other than connections needed for the servo itself. It also eliminates the need of using electrical wiring, contacts or special generators of electrical current.

Referring to Fig. 1, numeral 7 represents the engine of a motor vehicle. The engine is shown as provided with a carburetor 9 and an induction pipe 11 communicating with an intake manifold 13. At 15 is a lever pivoted to the induction pipe, the lever operating a throttle valve within the induction pipe.

The position of the engine in its relation to the car is made clear by Fig. 1 which shows the dash 19, the toe board at 21, and the floor board at 23. The gear shift lever 25 operates as usual to shift gears shown in part by numeral 27 located in transmission housing 29. Pivoted to the toe board 21 is an accelerator pedal 31 which is actuated to its release position by a spring 33. A tie-rod 35 connects the pedal 31 to the throttle lever 15. At 37 is the conventional clutch pedal pivoted at 39. This pedal operates to release the clutch. This clutch is located within the clutch housing 41. The clutch couples the engine crankshaft 43 to the clutch driven shaft 45. Counter-clockwise rotation of the pedal 37 releases the clutch.

There is provided a power-operated device to release the clutch and this power-operated device is rendered active incidental to the clockwise or release movement of the accelerator pedal 31. When the operator allows the accelerator pedal to swing up under the influence of spring 33, he not only cuts off the flow of explosive mixture but incidentally thereto he renders active the clutch-releasing power device. 47 is a power cylinder having a cover 49 with one or more air openings as shown at 51. A diaphragm 53 is clamped between the cylinder and the cover and carries a rod 55 jointed to a rod 57 which latter rod has a sliding connection with the end of a lever 59 carried by the pedal pivot shaft 39. By the provision of nuts 61 at the end of rod 57, a movement of the diaphragm 53 to the left from the position shown in Fig. 1 pulls upon the lever 59 and releases the clutch just as it may be released by depression of the clutch pedal 37. A spring 63 is shown operable to return the lever 59 to its initial position. This connection between rod 57 and lever 59 permits the operation of the clutch by the pedal 37 without producing any movement of the elements concerned with the power operation of the clutch.

The movement of the diaphragm to the left is produced by a pressure differential on the two sides of the diaphragm. Pressure on the right side is always atmospheric, owing to the openings 51. Provision is made to reduce the pressure on the left side of the diaphragm. A conduit 65 is connected to the manifold 13 and to one end of a valve member 67. The other end of the valve member has slidable therein a piston 69. To this piston is connected a rod 71 terminating in a valve 73 having opposite seats 75 and 77. A spring 79 tends to move the valve 73 to a position away from its seat 77. A pipe 81 connects the chamber in the power cylinder at the left of the diaphragm to the region of the valve member adjacent the valve and between the seats, so that the space in the power cylinder to the left of the diaphragm may be put into communication with the suction pipe 65 when the valve 73 is moved from its seat 77. When the valve 73 is on its seat 77, the pipe 81 connecting the power unit with the valve member 67 cooperates with a pipe 83 and communication is afforded with a control member 85 having an atmospheric opening 87.

A connection is provided between lever 15 and the piston 69 whereby the depression of the accelerator pedal 31 may not only rock lever 15 but also may move the valve 73 to its seat 77 to the end that the left side of the power unit may be vented through passages 81, 67, 83, and 85. With the parts in this position the clutch will be engaged by the springs usually provided for the purpose.

Since there must be provided a further throttle opening movement after the valve 73 is seated, the following structure is provided. A rod 89 is pivoted to the piston 69 and secured as by threading to the end of a spring housing 91. Slidable in the other end of the housing 91 is a head 93 on a rod 95 which is pivoted to an extension arm 97 of lever 15. A spring 99 within the cylinder 91 yieldingly permits movement of the throttle lever 15 after the valve 73 is seated as will be obvious.

While the accelerator pedal is in the dotted line position, the valve 73 will be drawn from its seat 77 and seated at 75 so that the engine suction is operable to pull the diaphragm 53 and release the clutch. The parts are so arranged that the first increment of movement of the pedal 31 downward from its dotted line position will move the valve 73 to its seat 77 without opening the throttle to any considerable extent, not enough to very greatly increase the rate of rotation of the engine shaft. This first increment of movement serves to vent the power cylinder and permit the clutch to engage. Thereafter, and upon further movement of accelerator 31, relative movement occurs between head 93 and cylinder 91 and the throttle continues to open.

If the operator now wishes to make a gear change or for any other reason wishes to release the clutch, as for coasting, he may remove his foot from the pedal 31 and the valve 73 shifts from seat 77 to seat 75 and the engine suction causes the clutch to be released. It may be that the operator will wish to use his engine for a brake, as on a steep hill. In that event he will relieve the pressure on the pedal 31 to an extent sufficient to partly cut off the supply of fuel, but not quite enough to reduce the engine to the idling speed it assumes when his foot is removed from the accelerator. This partial movement will be insufficient to move 73 from its seat 77 and the clutch will remain engaged so that the engine may be used as a brake. With complete removal of the foot the engine assumes idling speed and the clutch is released.

With a construction as above described, the operation may be somewhat unsatisfactory in one respect. If the operator releases the accelerator 31 the engine shaft 43 quickly comes to its idling speed while the momentum of the car prevents the shaft 45 from correspondingly reducing its rate of rotation. It may be that the operator will wish to increase the speed of the car before the rate of rotation of the two shafts has become synchronized. In his effort to increase the speed of the car he again depresses the pedal 31 which opens the throttle and vents the power cylinder through opening 87 as has been explained. This action would be attended by a prompt reengagement of the clutch. If such reengagement occurs while the shaft 45 is rotating faster than shaft 43, the engine momentarily checks the car speed by acting as a brake, an operation which the operator does not wish. This invention provides means to prevent the clutch reengagement under such circumstances until the shaft 43 under the influence of the opening throttle attains the speed of shaft 45. A flexible shaft 101 within a flexible shaft housing 103 takes its drive from a gear 105 in the gear housing 29. This gear 105 is rotated by one of the gears of the constant mesh train. It is therefore driven in timed relation to shaft 45. Another flexible shaft within shaft housing 107 is driven by gearing 109 associated with the crankshaft 43.

A differential device is operated by the two flexible shafts. It comprises a disc 111 rotatable with shaft 101 and a disc 113 rotatable with the other shaft. The discs are yieldingly pressed together by a spring 115. A cage 117 is located between the discs. The cage carries a circumferential series of balls 119 which are received in channels in the discs. The cage has an axial pin 121 on which is rotatably supported the end of a rod 123. Rod 123 is pivoted to the end of a rod 125 slidably guided in the end of member 85. This rod 125 has formed thereon a plunger 127. A closure plug 131 limits the movement of plunger 127 in one direction and a shoulder 133 limits the movement of an enlargement 129 on rod 125 in the opposite direction. A spring 135 biases the parts to the positions shown. The shaft 101 is geared so that it rotates at substantially the same rate of rotation as the shaft within housing 107 when the clutch is engaged. The discs are rotating in opposite directions and the balls between the discs are turning with rolling contact with both discs as long as the rotation of the shafts and discs continues at substantially the same rate. The balls will tend to revolve about the center of the discs only if there be inequality in the rate of rotation of the discs. There then follows a rotary movement of the cage and its pin 121. The drawings show the condition where disc 111, driven by shaft 103, is rotating at the same rate as disc 113. The cage 117 is not revolving. The plunger 127 is engaged with a stop 131 and the power unit is vented by the opening of pipe 83 to the air through the opening 87. With the power cylinder thus vented the clutch will be engaged by its springs as usual. The operator may then release pressure on accelerator 31, whereupon the valve 73 moves to close the air vent and open the suction passage. The clutch is thereby opened and the vehicle may coast. The tendency is then for the shaft 43 to quickly slow down while the momentum of the vehicle continues the rotation of shaft 45. This unequal rotation causes the cage 117 to rotate until part 129 engages the shoulder 133. The plunger 127 is thereby moved over the opening 87. If at this time the operator depresses the accelerator to increase the speed of the vehicle, the valve 73 cuts off the suction and if the clutch should be engaged the relatively slow speed of the engine shaft would serve as a brake on the clutch shaft and check the movement of the vehicle, but the clutch cannot engage until the vent 87 is opened and this venting cannot occur until the speed of the two discs 111 and 113 is the same, or so nearly the same that the spring 135 may move the plunger 127 to the position shown in the drawings. It will be understood that at starting the clutch is engaged by its conventional springs since there is then no engine suction to effect clutch release. Spring 135, too, holds the vent open as in Fig. 1. At starting, the throttle is partially opened by the pedal 31 or otherwise, thus closing the suction passage between tubes 65 and 81 and thereby providing communication between the power cylinder and vent opening 87. This condition permits the clutch to remain engaged by its springs until such time as the accelerator is released, thereby reestablishing the suction line and effecting clutch release.

A modified form of control mechanism is shown in Figs. 3 and 4. In the invention shown by these figures pinions are used on the adjacent ends of the shafts driven by the engine shaft and clutch shaft. These pinions engage pinions on a carrier like that of a conventional differential, and the rotation of the carrier is made use of to move the plunger 127 as in Fig. 1. Except for this difference the structure of this modification is the same as that illustrated by Fig. 1. Referring more particularly to Figs. 3 and 4, shaft 151 may be the shaft driven by the flexible shaft 101 and shaft 153 may be the shaft driven by the flexible shaft 107. These shafts 151 and 153 are journaled in brackets 155 and 157. Within the brackets 155 and 157 is a cage or pinion carrier 159 having diametrically opposed pins 161 for rotatably supporting bevel pinions 163 meshing with corresponding pinions 165 secured to the ends of shafts 151 and 153. The pinion carrier is itself rotatably supported on the shafts 151 and 153 immediately within the brackets.

Surrounding the carrier 159 and engaging an intermediate frictional face thereof at 165 is a friction band 167. The upper ends of the brackets have slots 169 and a pin 171 extends through the slots and is fixed in a block 173. One end of the friction band is pivotally anchored to the block as at 175. The other end of the block and the adjacent end of the band have cooperating lugs 177 and 179 separated by a spring 181. An adjustable bolt 183' is provided to adjustably connect the block to the end of the band and thereby predetermine the grip of the band on the friction surface 165 of the pinion carrier. The frictional grip should be sufficient to cause the band and the block to move with the carrier when unequal rotation occurs until the pin engages the one or the other of the ends of the slots. The block has a lug 183 to which is pivoted the equivalent of the rod 123 of Fig. 1, which rod is here represented as 123'.

The operation will be readily understood. When the shafts 103 and 107 are rotating at substantially equal speeds, the two pinions 163 are rotating in opposite directions at equal speeds and the carrier is not moving. If the pedal 31 be released, the clutch is automatically disengaged by the action of the suction from the manifold. Then the pinion 165 on shaft 151 rotates faster than the pinion 165 on shaft 153. The carrier 159 then rotates and carries the band and the block with it until the end of the slot engages the pin. As it moves with the brake band, the block pulls on rod 123' and draws the plunger over the opening 87.

If now the operator depresses the accelerator pedal 31 in an effort to speed up the vehicle, the valve 73 closes the suction conduit, but the venting of the power cylinder and the reengagement of the clutch cannot occur until the plunger 127 is moved from over the atmospheric opening 87. This movement cannot take place until the unequal rates of rotation of the two pinions 165 ceases. This stopping of the unequal rotation may occur by a decrease in the speed of the clutch or by an increase in the speed of the engine shaft. As soon as the pinions 165 rotate at equal speeds the spring 135 moves plunger 127 from over the opening 87 and the power cylinder is vented and the clutch will become engaged.

I claim:

1. In a motor vehicle, an engine having an engine shaft, a driving shaft, a clutch to couple said engine shaft and said driving shaft, yielding means to bias said clutch to engaged position, power means to release said clutch and means rotatable by a difference in rates of rotation of said shafts to prevent clutch engagement.

2. In a motor vehicle, an engine having an engine shaft, a driving shaft, a clutch to couple said engine shaft and said driving shaft, yielding means to bias said clutch to engaged position, power means to release said clutch and means mounted to have a limited movement of rotation dependent upon a difference in rates of rotation of said shafts to prevent clutch reengagement.

3. In a motor vehicle, an engine having an engine shaft, a driving shaft, a clutch to couple said engine shaft and said driving shaft, yielding means to bias said clutch to engaged position, a first driven shaft rotated by the engine shaft, a second driven shaft rotated by the driving shaft, said shafts being geared to have substantially the same rates of rotation when the said clutch is engaged, a member rotated by said shafts when rotating unequally, and means operated by the rotation of said member to prevent clutch engagement.

4. In a motor vehicle, an engine having an engine shaft, a driving shaft, a clutch to couple said engine shaft and said driving shaft, a fluid power unit having a movable member to release said clutch, a source of suction, a valve movable to afford communication between said power unit and said source of suction and also movable to a second position to cut off said suction and vent the power unit, a first driven shaft rotated by the engine shaft, a second driven shaft rotated by the clutch shaft, a cage rotated by said first and second shafts upon a difference in the rates of rotation of said shafts, means operated by said cage to prevent the venting of said power unit when said first and second driven shafts are rotating at different rates.

5. In a motor vehicle, in combination, an engine driving an auxiliary shaft rotatable at a predetermined speed ratio, an engine clutch, a clutch shaft, a second auxiliary shaft driven from the clutch shaft at approximately the same speed ratio as the first auxiliary shaft, said second shaft rotating in the reverse sense to the first shaft, the ends of the two shafts being located adjacent each other, a rotating element driven by the first shaft, a rotating element driven by the second shaft, differential means between the two rotating elements, a power device for disengaging the clutch, a control means to operate the power device, linkage connecting the differential means to the control means whereby clutch reengagement is prevented when the clutch shaft speed exceeds the engine speed.

6. In a servo mechanism for the engine clutch of a motor vehicle, in combination, engine throttle control mechanism, a chamber closed at one end containing a diaphragm, a connection between the diaphragm and the clutch disengaging mechanism, a valve casing having a connection to the intake manifold, a connection to the servo chamber, and a third connection to a second valve casing, a valve in the first valve casing connected to the engine throttle control mechanism so that the servo chamber is connected to the intake manifold when the throttle is closed, but is connected to the second valve casing when the throttle is opened, a valve in the second valve casing which cuts off connection between the interior and the atmosphere in one extreme position of travel and which permits connection between the atmosphere and the first valve casing in the second extreme position of travel, a shaft driven by the engine at a predetermined speed ratio, a second shaft driven by the engine clutch at approximately the same speed ratio as the engine drive to the first shaft, a disc driven by the first shaft, a second disc mounted coaxially and spaced from the first disc driven from the second shaft in reversed direction to the first disc, a set of balls between the discs in frictional contact with both discs, a spring maintaining a definite pressure between the balls and the discs, a cage engaging the balls to restrain their motion about the axis of the two discs, said cage being capable of a limited rotary motion about the axis of the discs, a link between the cage and the second valve arranged so that the valve is moved to the closed position when the clutch shaft turns faster than the engine shaft.

7. In a motor vehicle, an engine having an engine shaft, a driving shaft, a clutch to couple said engine shaft and said driving shaft, a fluid power unit having a movable member to release said clutch, a source of suction, a valve movable to afford communication between said power unit and said source of suction and also movable to a second position to cut off said suction and vent the power unit, a first driven shaft rotated by the engine shaft, a second driven shaft rotated by the clutch shaft, differential means including gear elements carried by said driven shafts and a carrier having pinions engaging said gears, and means responsive to the rotation of said carrier to prevent the venting of said power cylinder while the first and second driven shafts are rotating at different rates.

CHARLES F. KETTERING.